United States Patent
Hsyu et al.

(10) Patent No.: US 11,537,893 B2
(45) Date of Patent: Dec. 27, 2022

(54) METHOD AND ELECTRONIC DEVICE FOR SELECTING DEEP NEURAL NETWORK HYPERPARAMETERS

(71) Applicant: Industrial Technology Research Institute, Hsinchu (TW)

(72) Inventors: Ming-Chun Hsyu, Taipei (TW); Chao-Hong Chen, Tainan (TW); Chien-Chih Huang, Taoyuan (TW)

(73) Assignee: Industrial Technology Research Institute, Hsinchu (TW)

( * ) Notice: Subject to any disclaimer, the term of this patent is extended or adjusted under 35 U.S.C. 154(b) by 536 days.

(21) Appl. No.: 16/729,480

(22) Filed: Dec. 30, 2019

(65) Prior Publication Data
US 2021/0174210 A1    Jun. 10, 2021

(30) Foreign Application Priority Data
Dec. 5, 2019   (TW) .................................. 108144475

(51) Int. Cl.
*G06N 3/08*        (2006.01)
*G06N 3/04*        (2006.01)
(Continued)

(52) U.S. Cl.
CPC .......... *G06N 3/082* (2013.01); *G06K 9/6257* (2013.01); *G06K 9/6264* (2013.01); *G06N 3/0472* (2013.01); *G06N 20/00* (2019.01)

(58) Field of Classification Search
CPC ...... G06N 3/082; G06N 20/00; G06N 3/0472; G06K 9/6257; G06K 9/6264
See application file for complete search history.

(56) References Cited

U.S. PATENT DOCUMENTS 9,330,362 B2    5/2016  Bilenko et al.
10,185,803 B2   1/2019  Frey et al.
(Continued)

FOREIGN PATENT DOCUMENTS

CN    106570657    4/2017
CN    109635930    4/2019
(Continued)

OTHER PUBLICATIONS

Jasper Snoek, et al., "Practical Bayesian Optimization of Machine Learning Algorithms." Advances in Neural Information Processing Systems, Jun. 2012, pp. 2951-2959.
(Continued)

*Primary Examiner* — David F Dunphy
(74) *Attorney, Agent, or Firm* — JCIPRNET

(57) ABSTRACT

A method and an electronic device for selecting deep neural network hyperparameters are provided. In an embodiment of the method, a plurality of testing hyperparameter configurations are sampled from a plurality of hyperparameter ranges of a plurality of hyperparameters. A target neural network model is trained by using a training dataset and the plurality of testing hyperparameter configurations, and a plurality of accuracies corresponding to the plurality of testing hyperparameter configurations are obtained after training for preset epochs. A hyperparameter recommendation operation is performed to predict a plurality of final accuracies of the plurality of testing hyperparameter configurations. A recommended hyperparameter configuration corresponding to the final accuracy having a highest predicted value is selected as a hyperparameter setting for continuing training the target neural network model.

18 Claims, 6 Drawing Sheets

(51) Int. Cl.
*G06N 20/00* (2019.01)
*G06K 9/62* (2022.01)

(56) References Cited

U.S. PATENT DOCUMENTS

| | | | |
|---|---|---|---|
| 10,217,061 | B2 | 2/2019 | Hayes et al. |
| 10,275,719 | B2 | 4/2019 | Talathi et al. |
| 2018/0024509 | A1 | 1/2018 | Piche et al. |
| 2018/0121814 | A1* | 5/2018 | Yu .................. G06N 3/04 |
| 2019/0156229 | A1 | 5/2019 | Tee et al. |
| 2020/0380378 | A1* | 12/2020 | Moharrer ............... G06N 20/00 |

FOREIGN PATENT DOCUMENTS

| | | |
|---|---|---|
| CN | 110210609 | 9/2019 |
| TW | I584142 | 5/2017 |
| TW | 201923664 | 6/2019 |

OTHER PUBLICATIONS

Akshay Chandrashekaran, et al., "Speeding up Hyper-parameter Optimization by Extrapolation of Learning Curves using Previous Builds." ECML PKDD 2017: Machine Learning and Knowledge Discovery in Databases, Dec. 30, 2017, pp. 477-492.
Hieu Pham, el at., "Efficient Neural Architecture Search via Parameter Sharing." arXiv:1802.03268, Feb. 2018, pp. 1-11.
Elad Hazan, et al., "Hyperparameter Optimization: A Spectral Approach." ICLR 2018 Conference, Feb. 16, 2018, pp. 1-18.
Lisha Li, et al., "Hyperband: A Novel Bandit-Based Approach to Hyperparameter Optimization." Journal of Machine Learning Research, vol. 18, Apr. 2018, pp. 1-52.
Max Jaderberg, et al., "Population Based Training of Neural Networks." arXiv:1711.09846, Nov. 2017, pp. 1-21.
Alberto Costa, et al., "RBFOpt: an open-source library for black-box optimization with costly function evaluations." Mathematical Programming Computation, vol. 10, Aug. 27, 2018, pp. 597-629.
Bowen Baker, et al., "Accelerating neural architecture search using performance prediction." ICLR Workshops 2018, 2018, pp. 1-19.
"Office Action of Taiwan Counterpart Application", dated Mar. 16, 2021, p. 1-p. 9.

* cited by examiner

METHOD AND ELECTRONIC DEVICE FOR SELECTING DEEP NEURAL NETWORK HYPERPARAMETERS

CROSS-REFERENCE TO RELATED APPLICATION

This application claims the priority benefit of Taiwan application serial no. 108144475, filed on Dec. 5, 2019. The entirety of the above-mentioned patent application is hereby incorporated by reference herein and made a part of this specification.

TECHNICAL FIELD

The disclosure relates to a neural network technology, and relates to a method for selecting deep neural network hyperparameters and an electronic device having a function of selecting deep neural network hyperparameters.

BACKGROUND

Machine learning of a deep neural network usually involves a large number of free parameters for users to set according to their needs. For example, machine learning experts need to determine the depth of the neural network, select the connection relationship among the layers, select the optimization algorithm, and select the parameters in the optimization library. The parameters that are set before the model starts learning are referred to as hyperparameters (HPs), and the technique of adjusting the hyperparameters or finding suitable configurations of the hyperparameters is referred to as hyperparameter optimization (HPO).

In general, a typical method for performing automatic hyperparameter optimization is the Bayesian optimization (BO) algorithm. However, since the Bayesian optimization algorithm is serial in nature, parallelization would be difficult. Moreover, when the number of different hyperparameters included is excessively large, a curse of dimensionality may occur.

SUMMARY

The disclosure provides a method and an electronic device for selecting deep neural network hyperparameters, which can automatically optimize the hyperparameter configurations of the neural network.

An embodiment of the disclosure provides a method for selecting deep neural network hyperparameters, adapted for analyzing a plurality of hyperparameter configurations of a target neural network model, where each of the hyperparameter configurations includes a plurality of hyperparameters. The method includes the following steps. A plurality of testing hyperparameter configurations are sampled from hyperparameter ranges of the plurality of hyperparameters. The target neural network model is trained by using a first training dataset and the plurality of testing hyperparameter configurations, and a plurality of first accuracies corresponding to the plurality of testing hyperparameter configurations are obtained after training for first preset epochs. A hyperparameter recommendation operation is performed, and a first recommended hyperparameter configuration corresponding to the final accuracy having the highest predicted value is selected as a hyperparameter setting for continuing training the target neural network model. The hyperparameter recommendation operation includes the following steps. An interpolation function, based on an observation point set, and a recommended list of hyperparameter configurations are obtained by using a model-based optimization algorithm, wherein the observation point set includes the plurality of testing hyperparameter configurations and the plurality of first accuracies, and the recommended list of hyperparameter configurations includes a plurality of recommended hyperparameter configurations. A pre-trained model respectively corresponding to each of the plurality of recommended hyperparameter configurations is determined by using a trainable-weight-selecting method. The pre-trained models corresponding with the plurality of recommended hyperparameter configurations are trained by using a second training dataset and the plurality of recommended hyperparameter configurations, and a plurality of second accuracies corresponding to the plurality of recommended hyperparameter configurations are obtained after training for second preset epochs. The plurality of final accuracies corresponding to the plurality of second accuracies are predicted by using a predictive early stopping model.

An embodiment of the disclosure provides an electronic device adapted for analyzing a plurality of hyperparameter configurations of a target neural network model, where each of the hyperparameter configurations includes a plurality of hyperparameters. The electronic device includes a storage device and a processor. The storage device stores one or more commands. The processor is coupled to the storage device and is configured to execute the commands to perform the following operations. A plurality of testing hyperparameter configurations are sampled from hyperparameter ranges of the plurality of hyperparameters. The target neural network model is trained by using a first training dataset and the plurality of testing hyperparameter configurations, and a plurality of first accuracies corresponding to the plurality of testing hyperparameter configurations are obtained after training for first preset epochs. A hyperparameter recommendation operation is performed, and a first recommended hyperparameter configuration corresponding to the final accuracy having the highest predicted value is selected as a hyperparameter setting for continuing training the target neural network model. The hyperparameter recommendation operation includes the following operations. An interpolation function, based on an observation point set, and a recommended list of hyperparameter configurations are obtained by using a model-based optimization algorithm, where the observation point set includes the plurality of testing hyperparameter configurations and the plurality of first accuracies, and the recommended list of hyperparameter configurations includes a plurality of recommended hyperparameter configurations. A pre-trained model respectively corresponding to each of the plurality of recommended hyperparameter configurations is determined by using a trainable-weight-selecting method. The pre-trained models corresponding with the plurality of recommended hyperparameter configurations are trained by using a second training dataset and the plurality of recommended hyperparameter configurations, and a plurality of second accuracies corresponding to the plurality of recommended hyperparameter configurations are obtained after training for second preset epochs. The plurality of final accuracies corresponding to the plurality of second accuracies are predicted by using a predictive early stopping model.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
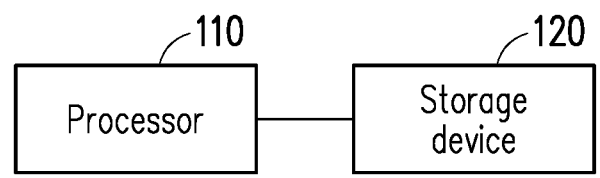
FIG. 1 is a block diagram showing an electronic device according to an embodiment of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

In the disclosure, under limited conditions, finding the reduced range of hyperparameter configurations is by using a small data training set. Sampling is performed on the reduced hyperparameter range, and the sampled hyperparameter configurations are fully trained to obtain accuracies. The hyperparameter configurations and the corresponding accuracies are set as an observation point set, and an interpolation function based on the observation point set and a recommended list of hyperparameter configurations are obtained by using the model-based optimization algorithm. A pre-trained model corresponding to each of the recommended hyperparameter configurations is determined by using the trainable-weight-selecting method, and the pre-trained models corresponding with the plurality of recommended hyperparameter configurations are trained by using a small training dataset and the recommended hyperparameter configurations to obtain the accuracies. Final accuracies corresponding to the accuracies of the recommended hyperparameter configurations are predicted by using the trained predictive early stopping model. Moreover, the recommended hyperparameter configuration corresponding to the final accuracy having the highest predicted value is selected as a hyperparameter setting for continuing training the target neural network model. Accordingly, the training amount of the neural network can be reduced to quickly find the better hyperparameter configurations of the neural network model.

FIG. 1 is a block diagram showing an electronic device according to an embodiment of the disclosure. Referring to FIG. 1, an electronic device 10 includes, but is not limited to, a processor 110, a storage device 120, and an input/output interface 130 (not shown). The processor 110 is coupled to the storage device 120 and may access or execute one or more commands stored in the storage device 120. In different embodiments, the processor 110 is, for example, a central processing unit (CPU), a programmable microprocessor, a graphics processing unit (GPU), an application specific integrated circuit (ASIC), another similar device, or a combination of the above devices, but the disclosure is not limited thereto.

The storage device 120 is configured to store various software, data, and various program codes required for running the method for selecting deep neural network hyperparameters, including one or more commands executable by the processor 110. The storage device 120 may be a fixed or movable random access memory (RAM), read-only memory (ROM), flash memory, hard disk drive (HDD), solid state drive (SSD), another similar device, or a combination of one or more of the above devices, but the disclosure is not limited thereto. The input/output interface may be a keyboard, a mouse, a digital tablet, a screen, or another similar device, but the disclosure is not limited thereto.

It is noted that, in the field of machine learning, a hyperparameter is a parameter value used to control the learning process of a machine learning model. In contrast, other parameter values (e.g., node weights) are values learned in the learning process. The types of hyperparameters include the optimizer as used, the optimizer parameter, the learning rate, the decay rate, the decay step, the batch size, etc. Hyperparameter configurations (HPCs) include a plurality of hyperparameters. The different hyperparameter configurations have hyperparameters of different values, and the values of these hyperparameters are used to train machine learning models.

Figure 2:
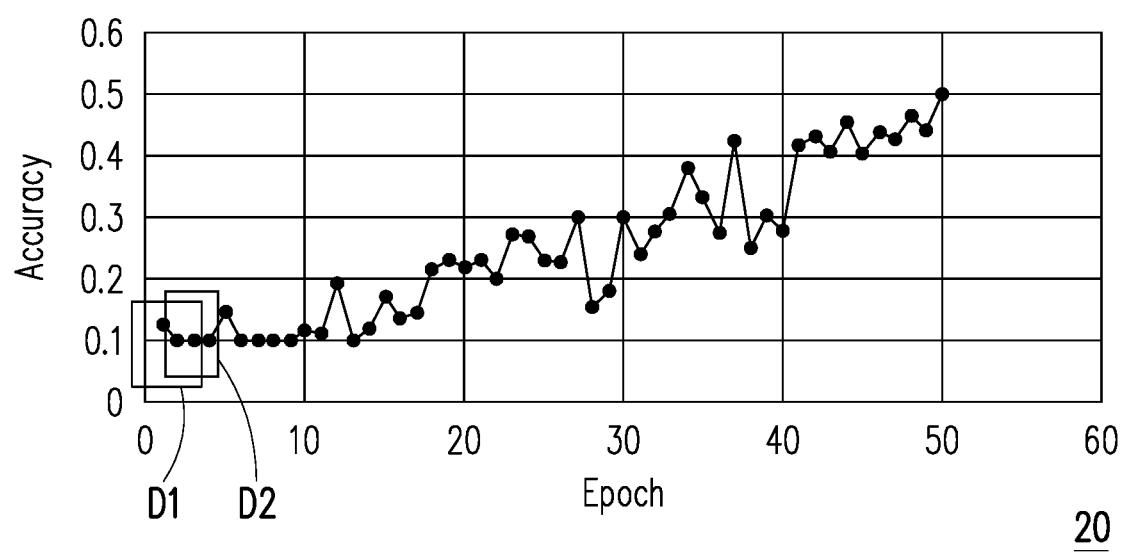
FIG. 2 is a schematic view showing a deep neural network learning curve according to an embodiment of the disclosure.

In addition, the batch size is the size of the number of samples input to the neural network model for training each time. One iteration is equivalent to training by using a batch size of samples once. One epoch is equivalent to training the neural network model by using all the samples in the training dataset once. For example, if the training dataset has 1000 samples and the batch size is 10 samples, then it takes 100 iterations and one epoch to train all samples. FIG. 2 is a schematic view showing a deep neural network learning curve according to an embodiment of the disclosure. Specifically, every time the machine learning model is trained by using the training dataset for an epoch, an accuracy is obtained. After training for a plurality of epochs to obtain a plurality of accuracies, a learning curve of the machine learning model can be plotted, such as a learning curve 20 shown in FIG. 2. In addition, if it is controlled to train the machine learning model by using a different hyperparameter configuration, another learning curve different from the learning curve 20 will be generated.

Figure 3:
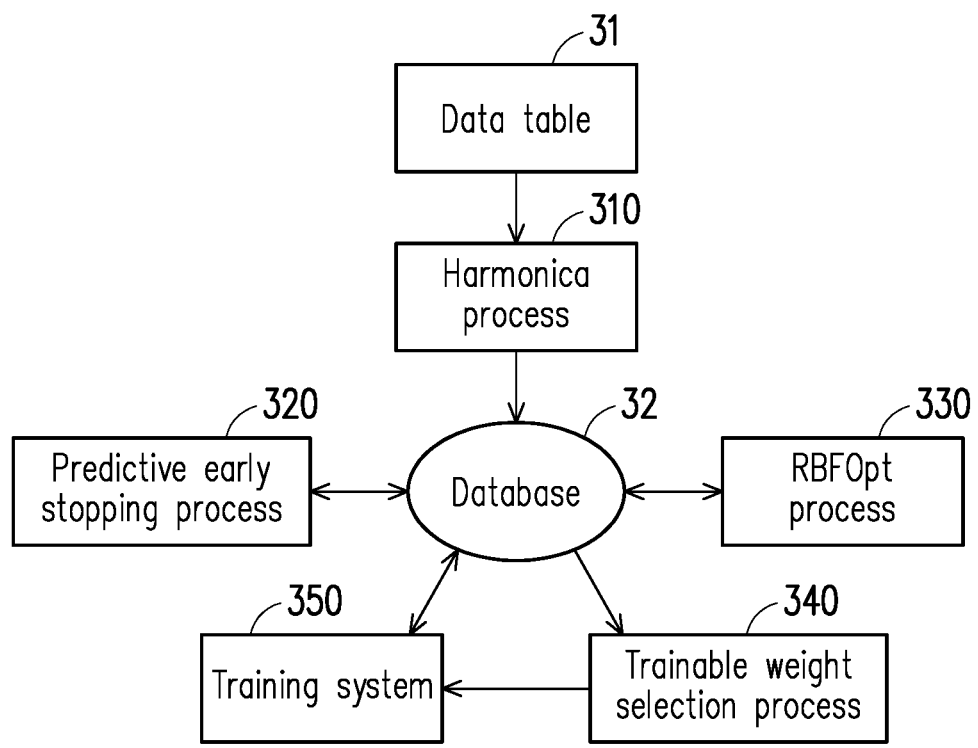
FIG. 3 is a schematic view showing data transfer based on a method for selecting deep neural network hyperparameters according to an embodiment of the disclosure.

FIG. 3 is a schematic view showing data transfer based on a method for selecting deep neural network hyperparameters according to an embodiment of the disclosure. The data table and the database presented in the data transfer view in FIG. 3 are automatically generated when the method for selecting deep neural network hyperparameters provided in the embodiment of the disclosure is executed. A database 32 occupies part of the storage space of the storage device 120. In an embodiment, when a data table 31 is input to a Harmonica process 310, the database 32 is triggered to operate together with functional blocks such as the Harmonica process 310, a predictive early stopping process 320, a radial basis function optimization (RBFOpt) process 330, a trainable weight selection process 340, and a training system 350. The data exchanged between the database and the functional blocks includes, for example, neural network weights, hyperparameter configurations, intermediate training information, etc. The data and the functional blocks may all be stored in the storage device 120, and each functional block may be executed by the processor 110. Those skilled in the art should know that the functional blocks disclosed in the embodiment of the disclosure may also be implemented by means of hardware circuits, and the disclosure is not limited thereto. The function of each functional block will be described later.

The method of the embodiment is applicable to the electronic device 10 described above. The detailed steps of the method for selecting deep neural network hyperparameters in the embodiment will be described below with reference to the devices and elements of the electronic device 10.

In the embodiment, the method for selecting deep neural network hyperparameters is divided into two main stages, including the first stage, i.e., search space reduction, and the second stage, i.e., hyperparameter optimization (HP optimization).

In the first stage, in search space reduction, the processor 110 finds the minimizers of the approximate Boolean function and the importance factor of each hyperparameter bit by using a small training dataset and the Harmonica process 310, and obtains a corresponding hyperparameter restricted range.

Figure 4:
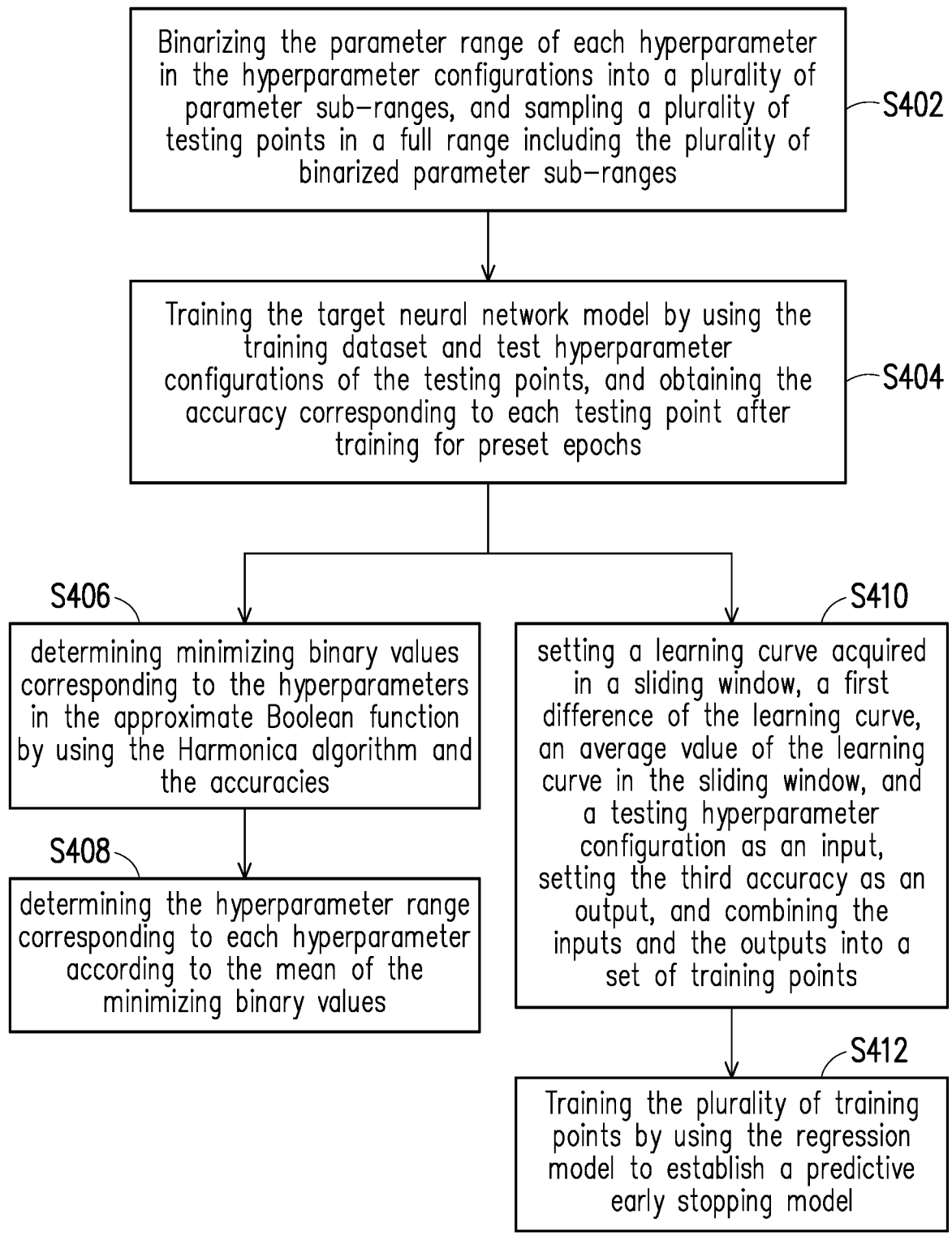
FIG. 4 is a flowchart showing a method for selecting deep neural network hyperparameters according to an embodiment of the disclosure.

FIG. 4 is a flowchart showing a method for selecting deep neural network hyperparameters according to an embodiment of the disclosure. The embodiment shows a method for finding the ranges of deep neural network hyperparameters and training the predictive early stopping model. Referring to FIG. 4, first, the processor 110 binarizes the parameter range of each hyperparameter in the hyperparameter configurations into a plurality of parameter sub-ranges, and samples a plurality of testing points in a full range including the plurality of binarized parameter sub-ranges (step S402). Specifically, the processor 110 divides the hyperparameter range of each hyperparameter for training the target neural network model in the hyperparameter configuration into a plurality of sub-ranges, and binarizes the divided sub-ranges into the parameter sub-ranges. Referring to Table 1 below, taking the hyperparameter "batch size" as an example, the processor 110 first divides the range [65, 255] of the batch size into four sub-ranges [65, 112], [113, 160], [161, 207], and [208, 255], and binarizes the divided sub-ranges respectively. Assuming that 2-bit Boolean encoding with code signs 1 and −1 is performed on the divided sub-ranges, then a code [1, 1] corresponding to the sub-range [65, 112], a code [1, −1] corresponding to the sub-range [113, 160], a code [−1, 1] corresponding to the sub-range [161, 207], and a code [−1, −1] corresponding to the sub-range [208, 255] as shown in Table 1 may be obtained. In the embodiment, the batch size is used as an example to describe the binarization. However, binarization may also be performed on the remaining hyperparameters in the hyperparameter configuration.

TABLE 1

| Batch size | x0, x1 |
|---|---|
| Sub-range [65, 112] | 1, 1 |
| Sub-range [113, 160] | 1, −1 |
| Sub-range [161, 207] | −1, 1 |
| Sub-range [208, 255] | −1, −1 |

After the encoding is completed, the processor 110 may sample a plurality of testing points from the binary codes. The sampling method is, for example, taking the midpoint of each sub-range as the testing point, or randomly sampling the testing points, but the disclosure does not limit the sampling method herein.

The processor 110 trains the target neural network model by using the training dataset and the test hyperparameter configurations of the testing points, and obtains the accuracy corresponding to each testing point after training for preset epochs (step S404). In this step, the training dataset used for training is a small training dataset. For example, the original training dataset has 50,000 entries of data, and ⅕ is used as the training dataset for training this time. Further to the example of step S402, in the embodiment, if two testing points "136" and "184" of the batch size are sampled, the processor 110 trains the target neural network model by using the small training dataset and the batch sizes of testing points. After training for preset epochs, accuracies corresponding to the two testing points "136" and "184" of the batch size are obtained. In this step, in addition to reducing the amount of the training data, the preset training epochs may similarly be reduced to avoid overfitting. Therefore, the preset epochs may be incomplete training epochs. In the embodiment, the complete training epochs are set to, for example, 100 epochs, and in this step, the incomplete training epochs may be set to 20 epochs, but the disclosure does not limit the number of the training epochs herein. Referring to Table 2 below, in the embodiment, a corresponding accuracy of 78% can be obtained after training the testing point "136", and a corresponding accuracy of 55% can be obtained after training the testing point "184".

TABLE 2

| Batch size | Accuracy |
|---|---|
| 136 | 78% |
| 184 | 55% |

The processor 110 determines fixed bits corresponding to the hyperparameters by using the Harmonica algorithm and the accuracies, and determines the hyperparameter range corresponding to each of hyperparameters according to the fixed bits. In detail, the processor 110 determines minimizing binary values corresponding to the hyperparameters in the approximate Boolean function by using the Harmonica algorithm and the accuracies (step S406). Specifically, the accuracies corresponding to the testing points obtained in step S404 are used as the input of the conventional Harmonica algorithm for training to obtain the minimizing binary values and importance factors. Moreover, the processor 110 determines the hyperparameter range corresponding to each hyperparameter according to the mean of the minimizing binary values (step S408).

The Harmonica algorithm is a fast hyperparameter optimization algorithm inspired by the technique of Boolean function analysis. The main concept of the Harmonica algorithm is to assume that the objective function of hyperparameter optimization is the real-valued Boolean function and can be approximated by the sparse and low degree polynomial. The polynomial is expressed by the Fourier basis (the random orthonormal family of Boolean functions, such as the parity function). This means that the objective function can also be approximated by the decision tree.

The details of the Harmonica algorithm will be described below. The Harmonica algorithm recovers the unknown sparse Fourier coefficients $\alpha \in R^n$ from the known observation vector $y \in R^m$ assuming $y = A\alpha + e$. The rows of matrix A in $y = A\alpha + e$ are known evaluated values of the Fourier basis, and e is assumed to be an unknown zero-mean Gaussian noise vector. The Harmonica algorithm uses the Lasso algorithm in a plurality of stages to solve the sparse Fourier coefficients of the sparse recovery problem. In other words, in each stage, the Harmonica algorithm determines some important bits from the sparse Fourier coefficients. By fixing the important bits, called the fixed bits, the Harmonica algorithm resamples the observation values and runs the Lasso algorithm iteratively to obtain another set of important bits. The Harmonica algorithm continues to perform the foregoing steps until the search space of the hyperparameter becomes small enough to allow the RBFOpt process in the second stage to effectively search in detail in the reduced search space.

In the embodiment, referring to Equation (1) for details of $y = A\alpha + e$.

$$\begin{pmatrix} f(x_1) \\ \vdots \\ f(x_n) \\ \vdots \end{pmatrix} = \begin{pmatrix} 1 & x_1 \dots & x_1 x_2 \dots \\ \vdots & \ddots & \vdots \\ & \dots & \end{pmatrix} \times \begin{pmatrix} \alpha_1 \\ \vdots \\ \alpha_n \\ \vdots \end{pmatrix} \quad (1)$$

$y = (f(\bar{x}_1), \ldots, f(\bar{x}_n), \ldots)^T$ represents accuracies corresponding to hyperparameter configurations $\bar{x}_1, \ldots, \bar{x}_n, \ldots$ (e.g., the accuracies corresponding to the hyperparameter configurations of testing points obtained in step S404). Each row of A, as shown in Equation (1), represents binary values of polynomial of each hyperparameter configuration (e.g., the hyperparameter configuration of the testing point). $\alpha_1, \ldots, \alpha_n, \ldots$ are the Fourier coefficients obtained by the Lasso algorithm, and the Fourier coefficients may be used to calculate the importance factors.

For example, Table 3 and Table 4 show the operation results of the Harmonica algorithm. Table 3 shows the fixed bits determined by the sign value of each bit of means of the minimizers of the approximate Boolean function (sparse and low degree polynomial) of a plurality of stages in the Harmonica algorithm. In the embodiment, the processor 110 inputs the plurality of accuracies corresponding to the testing points to the Harmonica algorithm. Moreover, the bits having the value of 0 among the fixed bits indicate that these bits are not reported by the approximate Boolean functions. Table 4 shows the importance factors corresponding to the bits, and the importance factors are obtained from the Fourier coefficients calculated by the Lasso algorithm. In an embodiment, the approximate Boolean function of a stage calculated by the Harmonica algorithm is, for example, expressed as Equation (2):

$$f = -2.7561532069x12*x14*x15*x21+ \\ 1.2004158501x0*x3+ \\ 1.1040464984x3*x11*x31*x33- \\ 1.0837903652x11*x27*x33*x39+ \\ 0.9975212011x0*x3*x25*x27 \quad (2)$$

Basically, the absolute value of each coefficient in Equation (2) plus 1 will be the importance factor of the bit shown in each mononomial. For example, the importance factor of x12 may be defined as |−2.75|+1=3.75. In addition, if a bit appears in two mononomials at the same time, e.g., x27, then the importance factor of x27 may be defined as |1.083|+|0.977|+1=3.08. The importance factors are obtained for each bit as shown in Table 4, and the processor 110 determine the reduced hyperparameter range according to the fixed bits. For example, further to the previous example, assuming that the fixed bits corresponding to the batch size are 1, −1, which correspond to the sub-range [113, 160], then the processor 110 may determine that the sub-range [113, 160] corresponding to the batch size is the reduced hyperparameter range of the batch size.

TABLE 3

| Fixed bit | [1, −1, 0, −1, 0, −1, −1, −1, 1, −1, −1, 1, −1, 1, 1, −1, 1, 0, 0, 0, 1, 1, 1, 1, 0, 1, 0, 1, 1, 0, 0, 1, 0, 1, 1, 0, 0, 0, 1, 1] |
|---|---|

TABLE 4

| Importance factor | [3.19, 3.69, 1.0, 4.30, 1.0, 5.49, 4.40, 3.69, 5.05, 2.79, 3.55, 3.18, 3.75, 3.26, 3.75, 3.75, 2.79, 1.0, 1.0, 1.0, 5.96, 3.75, 5.81, 4.40, 1.0, 1.99, 1.0, 3.08, 4.40, 1.0, 1.0, 2.10, 1.0, 3.18, 6.96, 1.0, 1.0, 1.0, 3.55, 2.08] |
|---|---|

In addition, the embodiment may also train a predictive early stopping model for use in the subsequent second stage. The term "early stopping" used to mean that people should stop training the target neural network model before it overfits. The predictive early stopping model provided in the embodiment predicts the final accuracy of the target neural network model based on the frequentist regression model.

Further to step S404, the processor 110 obtains a plurality of learning curves when training the target neural network by using different hyperparameter configurations. An accuracy is obtained after training the target neural network for a first epoch, a second accuracy is obtained after training for a second epoch, and so on. On each learning curve, there are a plurality of epochs and accuracies, as shown in the example of Table 5.

TABLE 5

| Epoch | Accuracy | Lr |
|---|---|---|
| 01 | 15% | 0.1 |
| 02 | 13% | |
| 03 | 26% | |
| 04 | 33% | |
| ... | ... | |
| 10 | 77% | |

The processor 110 sets a learning curve acquired in a sliding window, a first difference of the learning curve, an average value of the learning curve in the sliding window, and a testing hyperparameter configuration as an input, sets a third accuracy as an output, and combines the inputs and outputs into a set of training points (step S410). For example, the processor 110 sets the accuracies (i.e., the learning curve) corresponding to epoch 01 to epoch 03 in Table 5, the first difference among the accuracies (i.e., the first difference of the learning curve), the average value of the accuracies (i.e., the average value of the learning curve), and a learning rate Lr of the testing hyperparameter configuration as a set of input data D1, and sets the final accuracy of 77% as the output data of a first training point. As the sliding window moves forwards, the processor 110 sets the accuracies corresponding to epoch 02 to epoch 04 in Table 5, the first difference among the accuracies, the average value of the accuracies, and the learning rate Lr of the testing hyperparameter configuration as a set of input data D2, and sets the final accuracy of 77% as the output data of a second training point. Analogously, the data in Table 5 can be compiled into Table 6 as follows:

TABLE 6

| T0 | T1 | T2 | T1 − T0 | T2 − T1 | Average value | Lr | Label |
|---|---|---|---|---|---|---|---|
| 15% | 13% | 26% | −2% | 13% | 18% | 0.1 | 77% |
| 13% | 26% | 33% | 13% | 7% | 24% | 0.1 | 77% |
| 26% | 33% | ... | ... | ... | ... | 0.1 | 77% |
| ... | ... | ... | ... | ... | ... | 0.1 | 77% |

After obtaining the plurality of training points, the processor 110 trains the plurality of training points by using the regression model to establish a predictive early stopping model (step S412). The trained predictive early stopping model may be used to early predict the final accuracy when training the target neural network model for incomplete epochs, to determine whether training can be stopped. In the embodiment, the regression model is, for example, the support vector regression (SVR) model, but the disclosure is not limited thereto.

In the second stage, in hyperparameter optimization, the processor 110 performs the RBFOpt process 330 in FIG. 3 according to the reduced hyperparameter range and trains the target neural network model by using a full training dataset to find the best hyperparameter configuration. In the embodiment, the full training dataset includes the small training dataset. The trainable weight selection process 340 and the predictive early stopping process 320 shown in FIG. 3 will simultaneously assist the RBFOpt process 330 in obtaining the candidate hyperparameter configurations to rapidly obtain the global optimum. The detailed steps of the hyperparameter optimization in the second stage of the embodiment will be described below with reference to the devices and elements of the electronic device 10.

Figure 5:
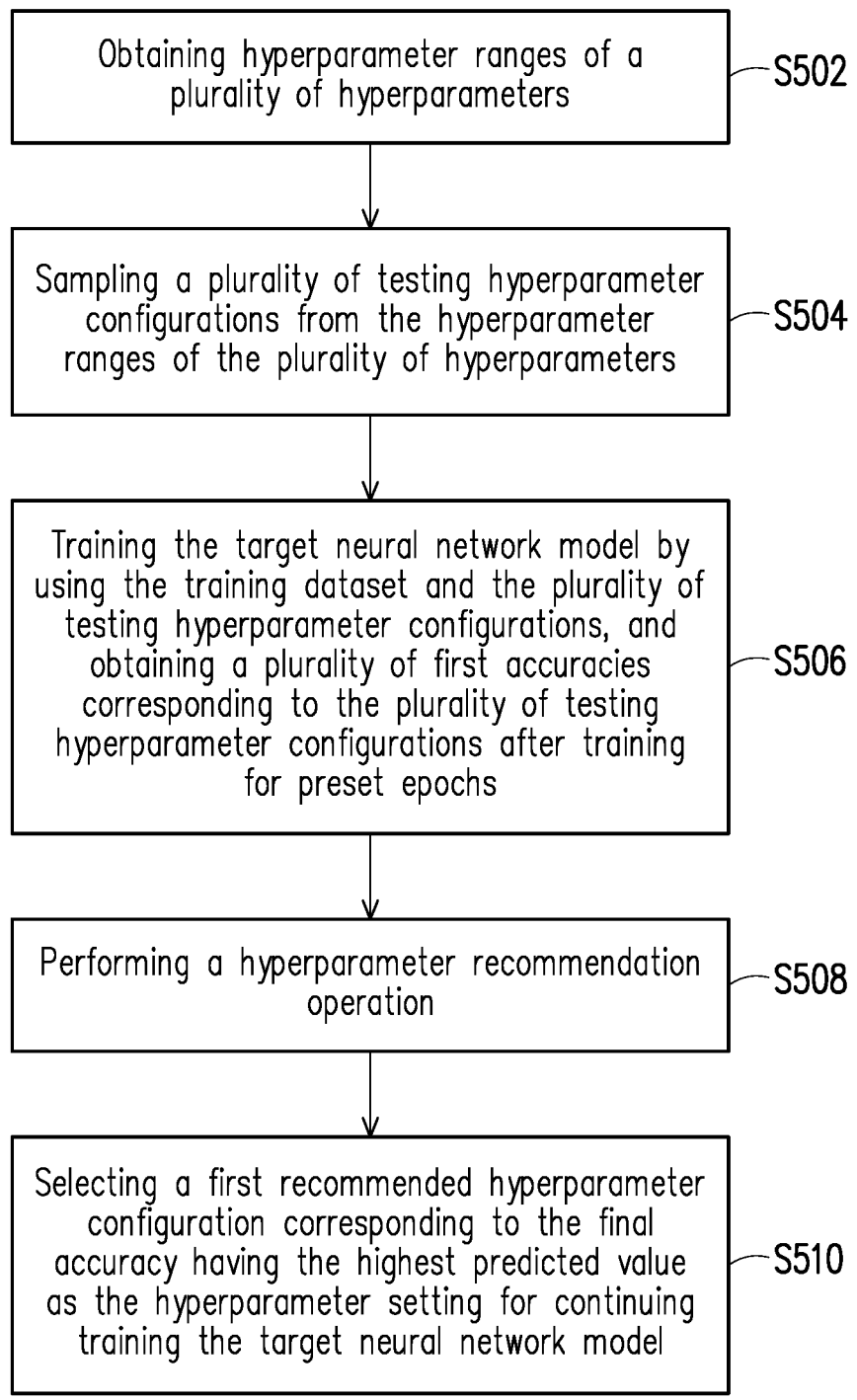
FIG. 5 is a flowchart showing a method for selecting deep neural network hyperparameters according to an embodiment of the disclosure.

FIG. 5 is a flowchart showing a method for selecting deep neural network hyperparameters according to an embodiment of the disclosure. Referring to FIG. 1, FIG. 3, and FIG. 5 at the same time, first, the processor 110 obtains hyperparameter ranges of a plurality of hyperparameters (step S502). The hyperparameter ranges may be obtained through the training method in the first stage of the embodiment, or may be obtained by using other training methods, which is not specifically limited in the disclosure.

The processor 110 samples a plurality of testing hyperparameter configurations from the hyperparameter ranges of the plurality of hyperparameters (step S504). In order to facilitate the subsequent execution of the RBFOpt process 330, the processor 110 first samples sufficient testing hyperparameter configurations from the hyperparameter ranges. The method for sampling the testing the hyperparameter configurations is, for example, Latin hypercube sampling or random sampling, and the disclosure is not limited thereto.

The processor 110 trains the target neural network model by using the training dataset and the plurality of testing hyperparameter configurations, and obtains a plurality of first accuracies corresponding to the plurality of testing hyperparameter configurations after training for preset epochs (step S506). In an embodiment, training is performed in step S506 by using the full training dataset and the complete training epochs, and validation is performed by using complete validation data.

The processor 110 performs a hyperparameter recommendation operation (step S508). The hyperparameter recommendation operation includes the RBFOpt process 330. Specifically, the RBFOpt process 330 is a deterministic algorithm and can find the global optimum value of the continuous nonconvex function under a compact domain. Based on an observation point set, the RBFOpt process 330 establishes an interpolation function as a surrogate model of the objective function by using radial basis functions (RBFs), and defines a utility function. The maximized value of the utility function is to evaluate the next point of the objective function. The utility function is defined as the reciprocal of the measurement of bumpiness of the interpolation function. After evaluating the validation accuracy of the next observation point, the RBFOpt process 330 iteratively interpolates this new observation point into the interpolation function and obtains an updated utility function. The RBFOpt process 330 continues to perform the foregoing operations until the computation budget is exhausted or a stable minimum value is found. In the hyperparameter recommendation operation provided in the embodiment, the RBFOpt process 330 further adopts a strategy of a recommended minimum target value list to attempt to calculate the utility function. At the same time, a predictive early stopping model is used to intervene in the hyperparameter configuration recommendation process.

Figure 6:
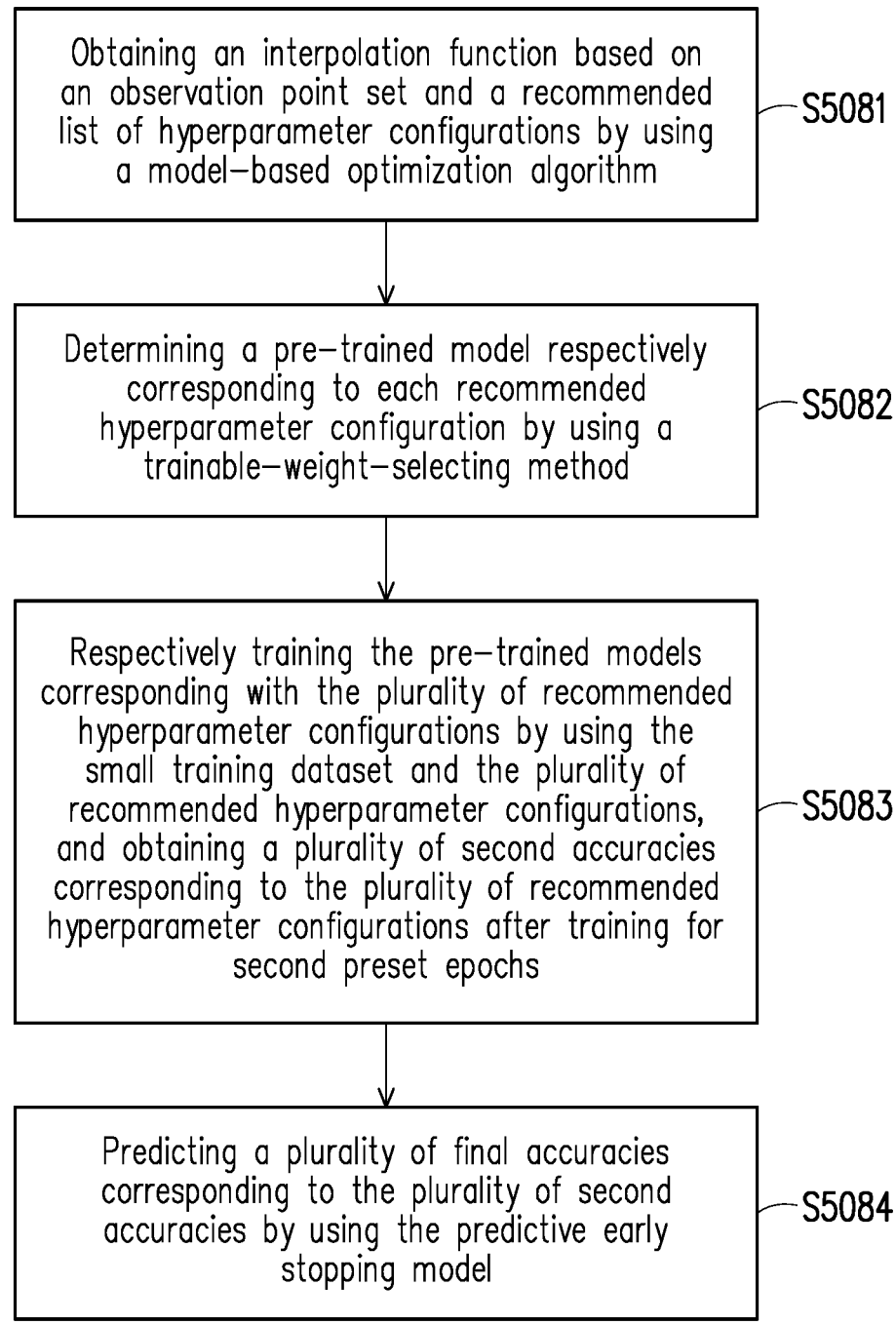
FIG. 6 is a flowchart showing a hyperparameter recommendation operation according to an embodiment of the disclosure.

FIG. 6 is a flowchart showing a hyperparameter recommendation operation according to an embodiment of the disclosure. For specific details of the hyperparameter recommendation operation provided in the disclosure, please refer to steps S5081 to S5083 in FIG. 6. Specifically, in the hyperparameter recommendation operation, the processor 110 may obtain an observation point set according to a plurality of testing hyperparameter configurations and the corresponding first accuracies. The observation point set includes the plurality of testing hyperparameter configurations trained in step S506 and the corresponding accuracies. Moreover, the processor 110 obtains an interpolation function based on an observation point set and a recommended list of hyperparameter configurations by using a model-based optimization algorithm (step S5081). The model-based optimization algorithm is, for example, a radial basis function algorithm, but the disclosure is not limited thereto. The recommended list of hyperparameter configurations obtained through the model-based optimization algorithm includes a plurality of recommended hyperparameter configurations, and the recommended hyperparameter configurations represent the hyperparameter configurations that are predicted to be able to obtain the best accuracies through training. The recommended list of hyperparameter configurations is shown in Table 7, for example:

TABLE 7

| Batch size | Interpolation function accuracy |
|---|---|
| 119 | 39% |
| 126 | 69% |
| 138 | 83% |
| 140 | 78% |
| 158 | 72% |

However, it is likely that the recommended hyperparameter configurations recommended in step S5081 may be erroneously recommended, so a small amount of data may be used to first test whether the obtained recommended hyperparameter configurations have good accuracies. First, the processor 110 performs the trainable weight selection process 340 to determine the selection of a suitable pre-trained model for each recommended list of hyperparameter configurations. Specifically, the processor 110 determines a pre-trained model respectively corresponding to each of the recommended hyperparameter configurations by using a trainable-weight-selecting method (step S5082). Through the previously trained hyperparameter configurations and the recommended hyperparameter configurations in the recommended list of hyperparameter configurations, the trainable-weight-selecting method finds the closest "distance" in the hyperparameter space to set as the pre-trained model. Below is a description of the trainable-weight-selecting method. From the training model corresponding to the plurality of previously trained hyperparameter configurations in the Harmonica algorithm above, a candidate "trainable weight setting" of the previously trained hyperparameter configuration is selected as the weight setting of the recommended hyperparameter configuration. The selected hyperparameter configuration HP* is determined by "distance" Equation (3) below. The trainable weights of the selected hyperparameter configuration HP* will be selected and used to train the trainable weight of the hyperparameter configuration $HP_{des}$ from warm start. HP* (the trainable weights of HP* will be selected and used to train the trainable weights of $HP_{des}$ from warm start)

$$= \underset{HP_{tra}}{\mathrm{argmin}}\, d(HP_{des}, HP_{tra}) = \underset{bHP_{tra}}{\mathrm{argmin}}\, d(bHP_{des}, bHP_{tra}) = \underset{bHP_{tra}}{\mathrm{argmin}} \quad (3)$$
$$d\left(\sum_i w_i |bHP_{des}^i - bHP_{tra}^i| + (1 - accucacy_{tra})\left\{\sum_i \mathbb{1}(w_i = 1)\right\}\right)$$

In Equation (3), $HP_{des}$ and $HP_{tra}$ respectively represent the hyperparameter configuration designated in the original hyperparameter space in which each hyperparameter takes a real value or integer value, and the previously trained hyperparameter configuration. $bHP_{des}$ and $bHP_{tra}$ respectively represent the designated hyperparameter configuration and the previously trained hyperparameter configuration after encoding. Each original hyperparameter is encoded as a multi-bit binary code {−1,1}, where −1 represents TRUE and 1 represents FALSE. $w_i$ represents the importance factor of the $i^{th}$ bit determined according to the Fourier coefficients $\alpha_s$s of the sparse and low degree polynomial, where $w_i=|\alpha_s|+1$, so $w_i$ may be assumed to be ≥1. In addition, the $w_i$s of the bits not reported by the approximate Boolean function in the Harmonica algorithm are set to 1 to avoid zero multiplication in Equation (3). $accucacy_{tra}$ represents the validation accuracy of the previously trained hyperparameter configuration in the Harmonica algorithm. $\Sigma_i \mathbb{1}(w_i=1)$ represents the number of all bits having the importance factor of 1. $(1-accucacy_{tra})$ represents the error rate.

Equation (3) considers not only the proximity of the designated hyperparameter configuration and the previously trained hyperparameter configuration in the encoding space, but also the ratio of the importance factor. In addition, when the proximity of the first part of Equation (3) is substantially the same, the accuracy of the previously trained hyperparameter configuration will dominate the result.

For example, assuming that the hyperparameter configuration includes a hyperparameter HP1 and a hyperparameter HP2, the values of the hyperparameter HP1 and the hyperparameter HP2, and the importance factors, binary codes, and error rates calculated by the Harmonica algorithm are shown in Table 8 below:

TABLE 8

| | HP1 | | HP2 | | |
| --- | --- | --- | --- | --- | --- |
| | Sub-range [65, 90] | | Sub-range [1e−4, 1e−3] | | |
| | Binary code b'1, 1' | | Binary code b'1, 1' | | |
| | Sub-range [91, 128] | | Sub-range [1e−3, 1e−2] | | |
| | Binary code b'1, −1' | | Binary code b'1, −1' | | |
| Group | Importance factor | Value | Importance factor | Value | Error rate |
| 1 | 3.5/3.5 | 80 b'1, 1' | 2.8/2.8 | 1e−3.5 b'1, 1' | 13% |
| 2 | | 100 b'1, −1' | | 1e−2.3 b'1, −1' | 10% |

In Table 8, the importance factor is the importance factor of the sub-range corresponding to each hyperparameter. This value may be calculated by the Harmonica algorithm, and the detailed calculation method has been described above and will not repeatedly described herein. The error rate respectively corresponds to each trained hyperparameter configuration $(1-accucacy_{tra})$ in Equation (3)). Assuming that in the hyperparameter configuration designated in the recommended list of hyperparameter configurations, HP1=85(bHP1=b'1, 1'), HP2=1e-3.2(bHP2=b'1, 1'), and $\Sigma_i \mathbb{1}(w_i=1)=5$, then the "distance" between the designated hyperparameter configuration and the trained hyperparameter configuration Groups 1 and 2 may be calculated respectively as Equations (4) and (5) below:

$$(3.5\times|1-1|+3.5\times|1-1|+2.8\times|1-1|+2.8\times|1-1|)+(0.13\times 5)=0.65 \quad (4)$$

$$(3.5\times|1-1|+3.5\times|1-(-1)|+2.8\times|1-1|+2.8\times|1-(-1)|)+ (0.1\times 5)=13.1 \quad (5)$$

After the above calculations, it is found that the distance between the designated hyperparameter configuration (HP1=85, HP2=1e-3.2) and the trained hyperparameter configuration (HP1=80, HP2=1e-3.5) is smaller. Therefore, the processor 110 takes the trainable weight data corresponding to Group 1 as the pre-trained model of the designated hyperparameter configuration. The processor 110 sets trainable weights corresponding to the recommended hyperparameter configuration as a trainable weight setting of the pre-trained model according to the distance.

In other words, the trainable weight data of Group 1 is the weight data to be set into the target neural network model. Therefore, the trainable weight data of Group 1 may be used as a training start point (warm start) of the target neural network model to continue training. Further to step S5082, the processor 110 respectively trains the pre-trained models corresponding with the plurality of recommended hyperparameter configurations by using the small training dataset and the plurality of recommended hyperparameter configurations, and obtains a plurality of second accuracies corresponding to the recommended hyperparameter configurations after training for preset epochs (step S5083). Moreover, the processor 110 predicts a plurality of final accuracies corresponding to the plurality of second accuracies by using the predictive early stopping model (step S5084). In the embodiment, the data amount of the training dataset used for training in step S5083 is less than the data amount of the training dataset used for training in step S506, and the number of training times of the preset epochs in step S5083 is less than the number of training times of the preset epochs in step S506.

In another embodiment, training is performed in step S506 by using the full training dataset and the complete training epochs, and validation is performed by using the complete validation data. Therefore, the data amount of the training dataset and the number of training epochs in step S506 are greater than the data amount and the training times in step S5083 and step S404 in the first stage. The data amount and the training times of step S404 in the first stage may be greater than those in step S5083, which is not specifically limited in the disclosure.

In the embodiment, training is performed in step S5083 by using a small training dataset and incomplete training epochs. Specifically, the processor 110 may continue the training by using a small training dataset and the recommended hyperparameter configurations, and at the same time using the trainable weight setting of the pre-trained model, to obtain accuracies corresponding to the recommended hyperparameter configurations after training for the preset epochs. Since training is performed for incomplete epochs in this step, after obtaining the accuracies, in the embodiment, final accuracies are further predicted by using the predictive early stopping process 320. The early stopping process 320 predicts the final accuracies corresponding to the incompletely trained accuracies through the predictive early stopping model, which can reduce the time required for training for multiple epochs.

For example, taking the batch size as an example, the processor 110 obtains an accuracy of 39%, for example, after training the pre-trained model for the 20$^{th}$ epoch by using a small training dataset and the batch size "119", and obtains an accuracy of 42%, for example, after training the pre-trained model for the 20$^{th}$ epoch by using the small training dataset and the batch size "138". At this time, the processor 110 predicts the accuracies obtained after training the pre-trained model for the 50$^{th}$ epoch or further epoch by using the predictive early stopping model. The predicted accuracies are as shown in Table 9 below. The predicted accuracy for the batch size "119" is 43%, and the predicted accuracy for the batch size "138" is 87%.

TABLE 9

| Batch size | Accuracy | Predicted accuracy |
|---|---|---|
| 119 | 39% | 43% |
| 138 | 42% | 87% |

After performing the hyperparameter recommendation operation, the processor 110 selects a first recommended hyperparameter configuration corresponding to the final accuracy having the highest predicted value as the hyperparameter setting for continuing training the target neural network model (step S510). In addition, the processor 110 trains the target neural network model by using the complete training dataset and the set hyperparameter setting, and obtains the eventual accuracy after the complete training epochs (e.g., 100 epochs).

Figure 7:
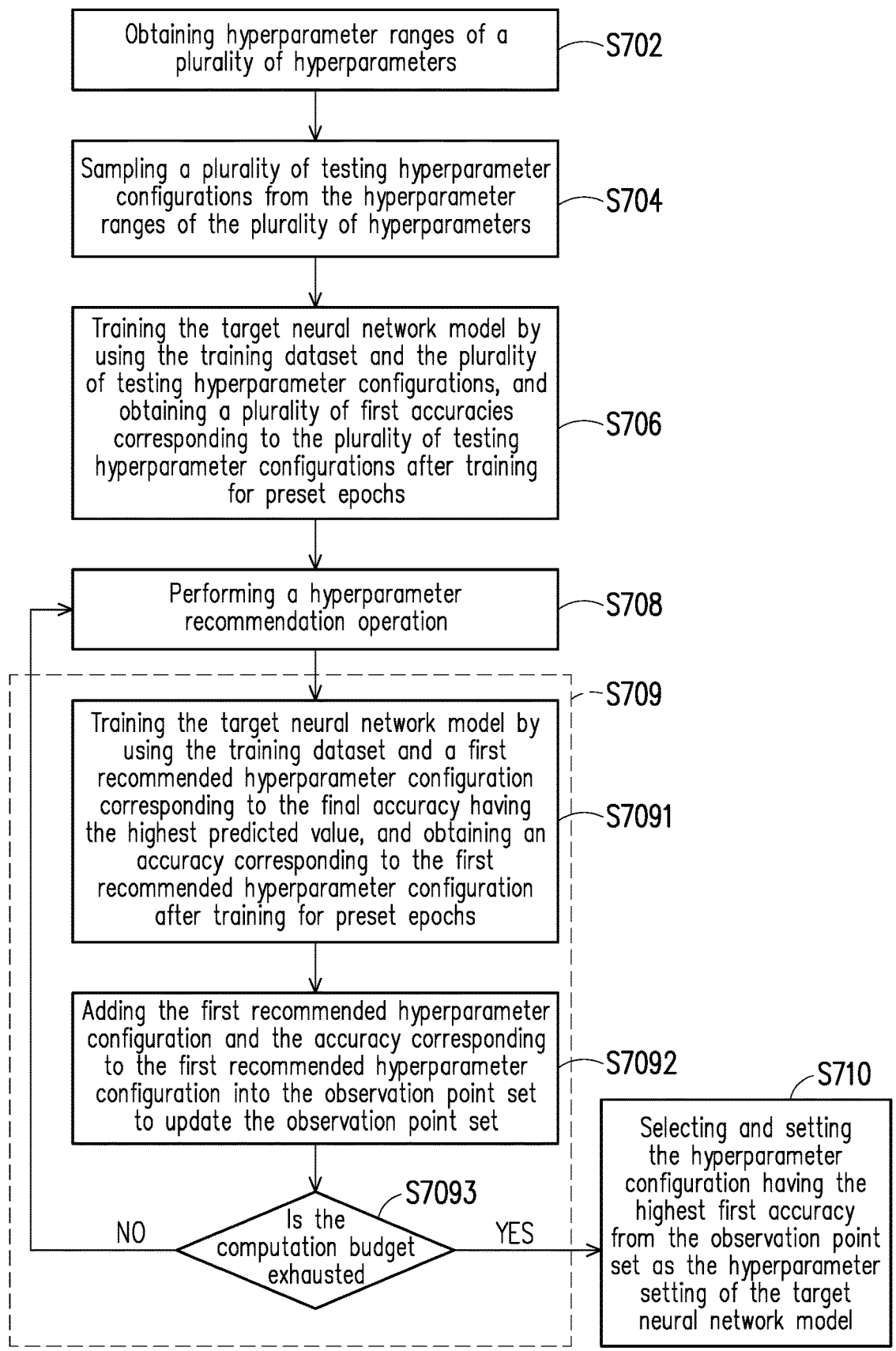
FIG. 7 is a flowchart showing a method for selecting deep neural network hyperparameters according to an embodiment of the disclosure.

FIG. 7 is a flowchart showing a method for selecting deep neural network hyperparameters according to an embodiment of the disclosure. Steps S702 to S708 in FIG. 7 are the same as steps S502 to S508 in FIG. 5, so reference may be made to the descriptions corresponding to steps S502 to S508. Referring to FIG. 7, the technical contents of steps S709 to S710 will be described below. In another embodiment, the processor 110 may further train the target neural network model by using the training dataset and a first recommended hyperparameter configuration corresponding to the final accuracy having the highest predicted value, and obtain an accuracy corresponding to the first recommended hyperparameter configuration after training for preset epochs (step S7091). In the embodiment, the training dataset used for training in this step is the full training dataset, and the preset epochs are the complete training epochs.

The processor 110 adds the first recommended hyperparameter configuration and the accuracy corresponding to the first recommended hyperparameter configuration into the observation point set to update the observation point set (step S7092). Moreover, the processor 110 determines whether the computation budget is exhausted (step S7093). If the computation budget has been exhausted ("YES" in step S7093), then the processor 110 selects and sets the hyperparameter configuration having the highest first accuracy from the observation point set as the hyperparameter setting of the target neural network model (step S710). If the calculation budget has not been exhausted ("NO" in step S7093), returning to step S708, the hyperparameter recommendation operation is performed according to the updated observation point set until the calculation budget is exhausted.

In other words, in step S709, after completely training the accuracy corresponding to the first recommended hyperparameter configuration, the processor 110 adds the first recommended hyperparameter configuration and the accuracy corresponding to the first recommended hyperparameter configuration into the observation point set to update the observation point set. The processor 110 performs the hyperparameter recommendation operation again according to the updated observation point set. The processor 110 repeats step S709 until the computation budget is exhausted. After the computation budget is exhausted, the processor 110 selects the hyperparameter configuration having the highest corresponding accuracy from the plurality of first accuracies as the final hyperparameter setting for training the target neural network model.

In summary of the above, the method and the electronic device for selecting deep neural network hyperparameters provided in the disclosure can automatically optimize the hyperparameter configuration of the neural network. Accordingly, the disclosure can reduce the training amount of the neural network and quickly optimize the hyperparameter configuration of the neural network model.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A method for selecting deep neural network hyperparameters, adapted for analyzing a plurality of hyperparameter configurations of a target neural network model, wherein each of the hyperparameter configurations comprises a plurality of hyperparameters, the method comprising:

sampling a plurality of testing hyperparameter configurations from hyperparameter ranges of the plurality of hyperparameters;
training the target neural network model by using a first training dataset and the plurality of testing hyperparameter configurations, and obtaining a plurality of first accuracies corresponding to the plurality of testing hyperparameter configurations after training for first preset epochs;
performing a hyperparameter recommendation operation, wherein the hyperparameter recommendation operation comprises:
obtaining an interpolation function based on an observation point set and a recommended list of hyperparameter configurations by using a model-based optimization algorithm, wherein the observation point set comprises the plurality of testing hyperparameter configurations and the plurality of first accuracies, and the recommended list of hyperparameter configurations comprises a plurality of recommended hyperparameter configurations;
determining a pre-trained model respectively corresponding to each of the plurality of recommended hyperparameter configurations by using a trainable-weight-selecting method;
respectively training the pre-trained models corresponding with the plurality of recommended hyperparameter configurations by using a second training dataset and the plurality of recommended hyperparameter configurations, and obtaining a plurality of second accuracies corresponding to the plurality of recommended hyperparameter configurations after training for second preset epochs; and
predicting a plurality of final accuracies corresponding to the plurality of second accuracies by using a predictive early stopping model; and
selecting a first recommended hyperparameter configuration corresponding to the final accuracy having a highest predicted value as a hyperparameter setting for continuing training the target neural network model.

2. The method for selecting deep neural network hyperparameters according to claim 1, wherein a data amount of the first training dataset is greater than a data amount of the second training dataset.

3. The method for selecting deep neural network hyperparameters according to claim 1, wherein the first preset epochs are greater than the second preset epochs.

4. The method for selecting deep neural network hyperparameters according to claim 1, wherein the method further comprises:
training the target neural network model by using the first training dataset and the first recommended hyperparameter configuration corresponding to the final accuracy having the highest predicted value, and obtaining the first accuracy corresponding to the first recommended hyperparameter configuration after training for the first preset epochs;
adding the first recommended hyperparameter configuration and the first accuracy into the observation point set to update the observation point set, and performing the hyperparameter recommendation operation according to the updated observation point set; and
selecting and setting the hyperparameter configuration having a highest first accuracy from the observation point set as the hyperparameter setting of the target neural network model when a computation budget is exhausted.

5. The method for selecting deep neural network hyperparameters according to claim 1, wherein the determining the pre-trained model respectively corresponding to each of the plurality of recommended hyperparameter configurations by using the trainable-weight-selecting method comprises:
calculating a distance between the recommended hyperparameter configuration and each of the hyperparameter configurations which have been trained in a hyperparameter space; and
setting trainable weights corresponding to the recommended hyperparameter configuration as a trainable weight setting of the pre-trained model according to the distance.

6. The method for selecting deep neural network hyperparameters according to claim 1, wherein before the sampling the plurality of testing hyperparameter configurations from the hyperparameter ranges of the plurality of hyperparameters, further comprises obtaining the hyperparameter ranges, which comprises:
binarizing a parameter range of each of the plurality of hyperparameters in the hyperparameter configurations into a plurality of parameter sub-ranges, and sampling a plurality of testing points in a full range including the plurality of binarized parameter sub-ranges; and
training the target neural network model by using the second training dataset and each of the hyperparameter configurations of the plurality of testing points, and obtaining a plurality of third accuracies corresponding to the plurality of testing points after training for third preset epochs.

7. The method for selecting deep neural network hyperparameters according to claim 6, wherein the obtaining the hyperparameter ranges comprises:
determining a plurality of fixed bits corresponding to the plurality of hyperparameters by using a Harmonica algorithm and the third accuracies; and
determining the hyperparameter range corresponding to each of the plurality of hyperparameters according to the plurality of fixed bits.

8. The method for selecting deep neural network hyperparameters according to claim 6, wherein the method further comprises:
setting a learning curve acquired in a sliding window, a first difference of the learning curve, an average value of the learning curve in the sliding window, and the testing hyperparameter configuration as an input, setting the third accuracy as an output, and combining the inputs and the outputs into a set of training points; and
training a plurality of the training points by using a regression model to establish the predictive early stopping model.

9. The method for selecting deep neural network hyperparameters according to claim 6, wherein the third preset epochs are greater than the second preset epochs, and the third preset epochs are less than the first preset epochs.

10. An electronic device adapted for analyzing a plurality of hyperparameter configurations of a target neural network model, wherein each of the hyperparameter configurations comprises a plurality of hyperparameters, the electronic device comprising:
a storage device, storing one or more commands; and
a processor, coupled to the storage device, the processor being configured to execute the commands to:
sample a plurality of testing hyperparameter configurations from hyperparameter ranges of the plurality of hyperparameters;

train the target neural network model by using a first training dataset and the plurality of testing hyperparameter configurations, and obtain a plurality of first accuracies corresponding to the plurality of testing hyperparameter configurations after training for first preset epochs;

perform a hyperparameter recommendation operation, wherein the hyperparameter recommendation operation comprises:

obtaining an interpolation function based on an observation point set and a recommended list of hyperparameter configurations by using a model-based optimization algorithm, wherein the observation point set comprises the plurality of testing hyperparameter configurations and the plurality of first accuracies, and the recommended list of hyperparameter configurations comprises a plurality of recommended hyperparameter configurations;

determining a pre-trained model respectively corresponding to each of the plurality of recommended hyperparameter configurations by using a trainable-weight-selecting method;

respectively training the pre-trained models corresponding with the plurality of recommended hyperparameter configurations by using a second training dataset and the plurality of recommended hyperparameter configurations, and obtaining a plurality of second accuracies corresponding to the plurality of recommended hyperparameter configurations after training for second preset epochs; and predicting a plurality of final accuracies corresponding to the plurality of second accuracies by using a predictive early stopping model; and select a first recommended hyperparameter configuration corresponding to the final accuracy having a highest predicted value as a hyperparameter setting for continuing training the target neural network model.

11. The electronic device according to claim 10, wherein a data amount of the first training dataset is greater than a data amount of the second training dataset.

12. The electronic device according to claim 10, wherein the first preset epochs are greater than the second preset epochs.

13. The electronic device according to claim 10, wherein the processor is further configured to:

train the target neural network model by using the first training dataset and the first recommended hyperparameter configuration corresponding to the final accuracy having the highest predicted value, and obtain the first accuracy corresponding to the first recommended hyperparameter configuration after training for the first preset epochs;

add the first recommended hyperparameter configuration and the first accuracy into the observation point set to update the observation point set, and perform the hyperparameter recommendation operation according to the updated observation point set; and select and set the hyperparameter configuration having a highest first accuracy from the observation point set as the hyperparameter setting of the target neural network model when a computation budget is exhausted.

14. The electronic device according to claim 10, wherein in the operation of determining the pre-trained model respectively corresponding to each of the plurality of recommended hyperparameter configurations by using the trainable-weight-selecting method, the processor is further configured to:

calculate a distance between the recommended hyperparameter configuration and each of the hyperparameter configurations which have been trained in a hyperparameter space; and set trainable weights corresponding to the recommended hyperparameter configuration as a trainable weight setting of the pre-trained model according to the distance.

15. The electronic device according to claim 10, wherein in the operation of sampling the plurality of testing hyperparameter configurations from the hyperparameter ranges of the plurality of hyperparameters, the processor is further configured to obtain the hyperparameter ranges, which comprises:

binarizing a parameter range of each of the plurality of hyperparameters in the hyperparameter configurations into a plurality of parameter sub-ranges, and sampling a plurality of testing points in a full range including the plurality of binarized parameter sub-ranges; and training the target neural network model by using the second training dataset and each of the hyperparameter configurations of the plurality of testing points, and obtaining a plurality of third accuracies corresponding to the plurality of testing points after training for third preset epochs.

16. The electronic device according to claim 15, wherein in the operation of obtaining the hyperparameter ranges, the processor is further configured to:

determine a plurality of fixed bits corresponding to the plurality of hyperparameters in the third accuracies by using a Harmonica algorithm and the third accuracies; and determine the hyperparameter range corresponding to each of the plurality of hyperparameters according to the plurality of fixed bits.

17. The electronic device according to claim 15, wherein the processor is further configured to:

set a learning curve acquired in a sliding window, a first difference of the learning curve, an average value of the learning curve in the sliding window, and the testing hyperparameter configuration as an input, set the third accuracy as an output, and combine the inputs and the outputs into a set of training points; and train a plurality of the training points by using a regression model to establish the predictive early stopping model.

18. The electronic device according to claim 15, wherein the third preset epochs are greater than the second preset epochs, and the third preset epochs are less than the first preset epochs.

* * * * *